UNITED STATES PATENT OFFICE.

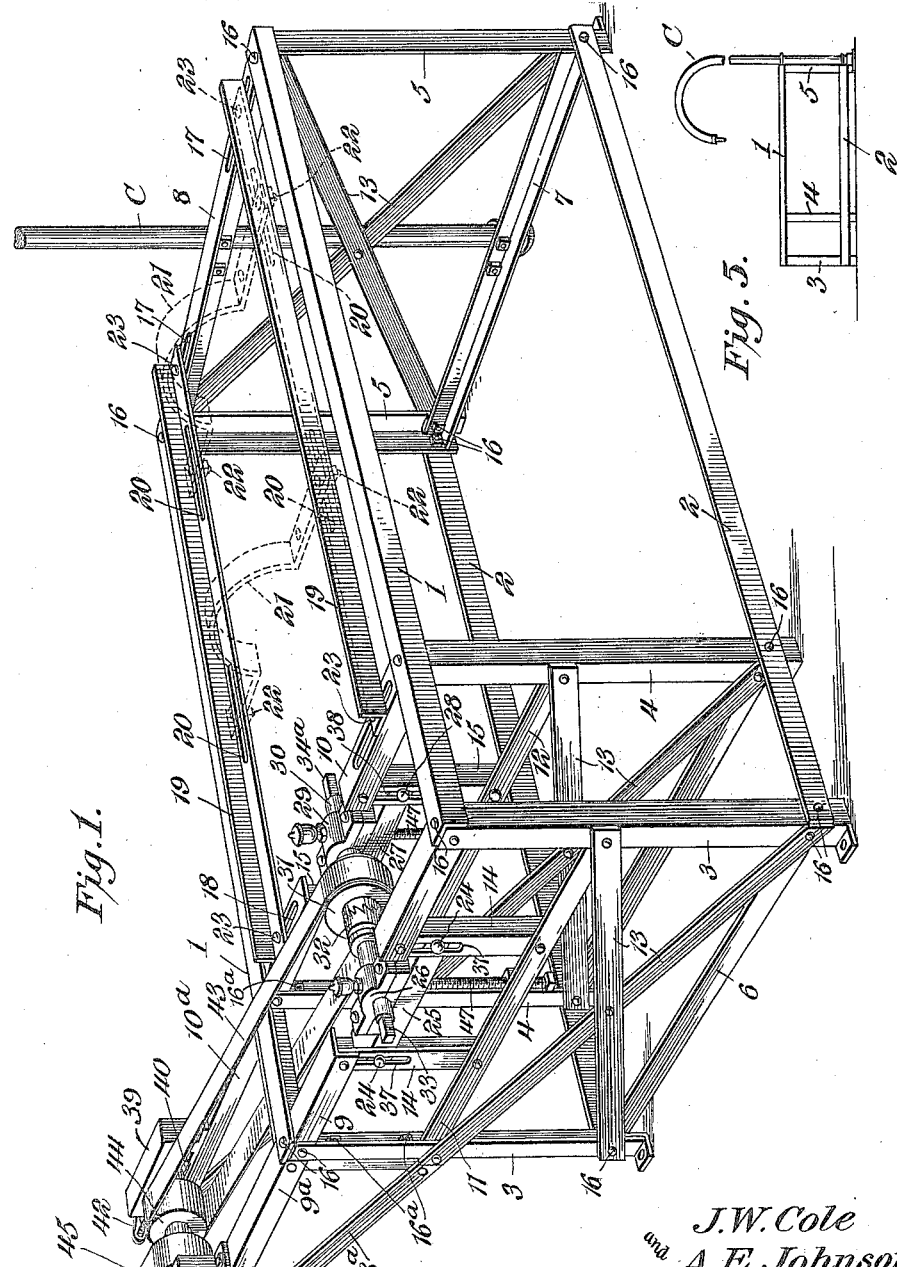

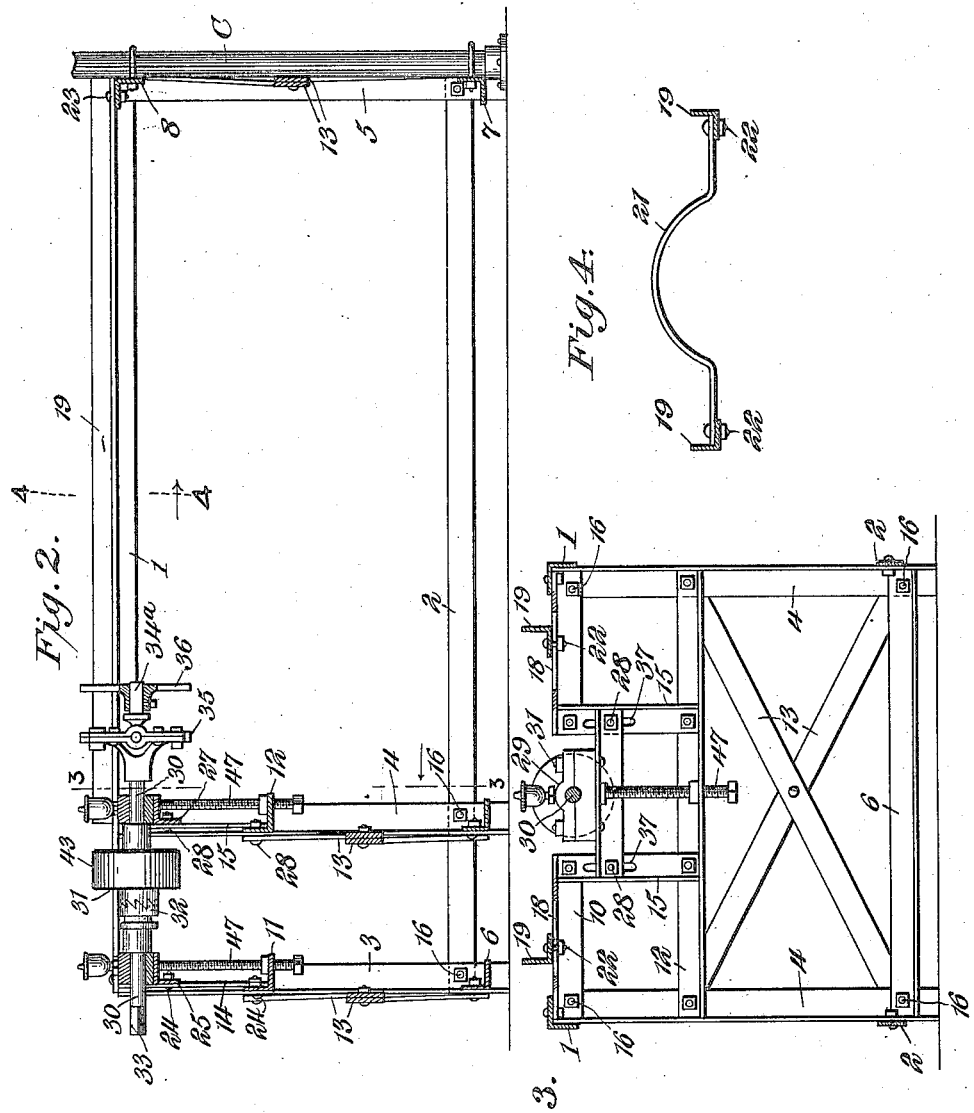

JOHN W. COLE AND ALVIA E. JOHNSON, OF ST. FRANCIS, KANSAS.

AUTOMOBILE REPAIR STAND.

1,424,190.　　　　Specification of Letters Patent.　　Patented Aug. 1, 1922.

Application filed October 9, 1920. Serial No. 415,798.

*To all whom it may concern:*

Be it known that we, JOHN W. COLE and ALVIA E. JOHNSON, citizens of the United States, residing at St. Francis, in the county of Cheyenne and State of Kansas, have invented a new and useful Automobile Repair Stand, of which the following is a specification.

This invention has reference to automobile engine repair stands, and its object is to provide a stand, more particularly for shop use, on which an automobile engine, removed from the automobile, may be mounted for adjustment into various positions facilitating overhauling and repairs.

In accordance with the invention, the stand is made, in most part, of angle bars joined together at their meeting points, at some places permanently and at others so arranged as to provide for adjustments. Provision is made for supporting the engine in such manner that moving parts may be actuated and other parts may be upheld against the action of gravity without depending upon special fastening means or the fastening means belonging to the engine itself. Provision is made for leveling the engine and for connecting driving means thereto in a manner avoiding strains or distortions and permitting the trying out of the engine after repairs without the necessity of first mounting the engine in the chassis of the automobile.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:

Figure 1 is a perspective view of the stand ready to receive an automobile engine after the removal of the latter intact from the automobile.

Figure 2 is a central vertical longitudinal section of the structure shown in Figure 1.

Figure 3 is a section on the line 3—3 of Figure 2.

Figure 4 is a section on the line 4—4 of Figure 2, distant parts being omitted, but showing an attached cradle.

Figure 5 is a skeleton view showing the application of a crane to the stand.

Referring to the drawings, there is shown a framework comprising longitudinal beams 1, 2, uprights 3, 4 and 5, and cross beams 6, 7, 8, 9, 10, 11 and 12, all of angle metal, such metal being employed both because of its lightness and strength. The frame may also be provided with crossed braces 13 wherever necessary.

The cross beams 9 and 10 are sectional beams, each being made up of two lengths spaced apart at the adjacent ends which are located on opposite sides of the longitudinal center line of the frame. The inner spaced ends of the cross beam 9 are supported by respective uprights 14 permanently or otherwise fast to the cross beams 9 and 11. The cross beam 10 is supported by uprights 15 permanently fast to the adjacent ends of the beam 10 and to the cross beam 12.

The various parts of the frame so far described may be permanently joined, or where joined they may be fastened together by removable means, such as bolts 16. It may be advantageous to have all the parts secured together by removable fastening devices, this especially facilitating transportation.

Some parts, however, are made adjustable. The cross bar 8 has longitudinal slots 17 near opposite ends in what constitutes its top web and the cross bar 10 has similar slots 18 in each section of the bar. Resting on the bars 8 and 10 are longitudinal angle bars 19 each having longitudinal slots 20. Each bar 19 has one web lying flat on the bars 8 and 10 and the other web upright. Supported by the slotted webs of the bars 19 are cradles 21 each in the form of an appropriately bent strip having its end portions adapted to rest on the bar 19 and the cradles 21 are suitably perforated to permit fastening bolts 22 to traverse the slots 20 and the cradles 21. Bolts 23 traversing the bars 19 and the slots 17 and 18 serve to hold the bars 19 in appropriately spaced relation.

Secured to the uprights 14 by bolts 24 or other suitable fastening devices is a cross strip 25 which may be formed of angle material, and the cross strip 25 serves as a support for a journal boxing 26. The uprights 15 carry a cross strip 27 like the cross strip 25 and secured thereto by bolts 28 or otherwise, and the strip 27 carries a journal boxing 29.

Mounted in the journal boxings or bearings 26 and 29 is a shaft 30 which, between the two journal boxings, is provided with a loose pulley 31 and a clutch 32. One end of the shaft 30 is squared, as shown at 33, and the other end of the shaft has a squared end 34 carrying a universal joint coupling 35, having a squared end 34$^a$ to receive a coupling plate 36, whereby the shaft may be coupled up to a similar part of the automobile engine, such part being usually present where the engine connects by a universal coupling to the transmission shaft of the automobile but which shaft is not removed from the automobile when the engine is taken down.

At one upper corner of the frame 1 is a bracket 13$^a$ having beam portions 9$^a$, and 10$^a$, constituting continuations of the beams 9 and 10, respectively, the bracket being made fast to the main frame by bolts 16$^a$ or by other means facilitating assembling and dismantling of the repair stand.

Mounted on the other end of the bracket 13$^a$ are guides 39 in turn carrying journal bearings 40 having a countershaft 41 journaled therein. The countershaft carries pulley wheels 44 and 45 and is adjustable back and forth by means of screw-threaded shafts engaging bearings 40 at their ends and passing through the guides 39. These shafts are turned by cranks 42. Pulley 45 is driven by a belt 46 and the pulley 44 is connected with pulley 31 by means of a belt 43 so that shaft 30 may be rotated. Clearly, by disengaging clutch 32, the shaft 30 is disconnected from the source of power, so that the engine being repaired or tested may be stopped at will without stopping the belt 46.

The bolts 24 and 28 work through slots 37 and 38 in the posts 14 and 15 respectively, so that the journal boxes 26 and 29 and the shaft 30 carried thereby may be raised or lowered. This is conveniently accomplished by means of adjusting screws 47 traversing and finding support in the cross pieces 25 and 27 respectively. Such adjustments together with the coupling 35 provides for considerable displacement out of level of the engine so that it is not necessary in testing the engine to level it in order that it may be properly driven while on the stand. When the engine is placed on the stand the crank case portion of the engine may be carried by the cradles 21 and supporting brackets, which latter are usually fast to the engine, may rest upon the beams 19. The various adjustments provided facilitate handling of the engine while being dismantled and repaired, and after the repairs have been completed the shaft 30 may be connected up to the engine and power applied to rotate the crank shaft of the engine, whereby to try out the engine, or by the continued application of power to produce a running fit of the parts without the necessity of running the engine under its own power.

A crane C, swiveled to the end of the stand remote from the shaft 30, provides a convenient means for handling the engine when removing it from and replacing it in the automobile.

This application is a continuation in most part of our application, Serial No. 288,978 for automobile repair stand, filed April 10, 1919, and which was allowed April 10, 1920.

What is claimed is:

1. An engine stand having a frame formed of longitudinal and cross bars and uprights joined together, certain of the cross bars being longitudinally slotted, and longitudinal angle bars supported upon and adjustably connected to the cross bars by way of the longitudinal slots thereof and spaced from said longitudinal bars and said longitudinal angle bars being longitudinally slotted for attachment of the engine thereto.

2. An engine stand having a frame formed of longitudinal and cross bars and uprights joined together, certain of the cross bars being longitudinally slotted, and longitudinal angle bars supported upon and adjustably connected to the cross bars by way of the longitudinal slots thereof and spaced from said longitudinal bars and said longitudinal angle bars being longitudinally slotted for attachment of the engine thereto, the frame also including cradles adapted to and supported by the longitudinal angle bars and connected thereto by way of the slots in the longitudinal angle bars, for supporting certain parts of the engine.

3. An engine stand comprising longitudinal and cross bars and uprights, certain of the cross bars being located near one end of the frame and having their continuity interrupted, other uprights supporting the adjacent ends of those cross bars having their continuity interrupted, journal bearings carried by the last named uprights and adjustable up and down with relation thereto between the adjacent ends of the interrupted cross bars, and means for supporting an engine on the stand with the crank shaft of the engine in line with the shaft belonging to the stand.

4. An engine stand comprising a suitable frame, longitudinally slotted elongated bars mounted lengthwise of the frame and said frame having supporting bars for the longitudinal bars slotted crosswise of the frame, whereby the bars may be adjusted toward and from each other, and cradle members having means at the ends for traversing the longitudinal slots of the supporting bars to support the cradle bars and permit their adjustment lengthwise of the frame.

5. An engine stand comprising a frame, a support for an engine mounted on the frame, a drive shaft also mounted on the frame, and a pair of journal bearings for the drive shaft, each journal having independent means for adjusting it up and down to aline the drive shaft with the crank shaft of the engine, the support for the engine being adjustable both lengthwise and crosswise of the frame to accommodate the crank shaft of the engine to the drive shaft crosswise of the frame.

6. An engine stand comprising longitudinal and cross bars and uprights, certain of the cross bars being longitudinally slotted, longitudinal angle bars supported on the cross bars in spaced relation to said longitudinal bars and slotted longitudinally at spaced points, cradles having their ends resting upon the longitudinal angle bars, means for adjustably connecting the cradles to the slotted parts of said angle bars, means for adjustably connecting the ends of said angle bars to said cross bars, a short drive shaft mounted at one end of the frame, and extending lengthwise thereof, and journal supports for said drive shaft, having means for adjusting said shaft vertically to bring it in line with the crank shaft of the engine.

7. An engine stand comprising long and cross bars and uprights, a bracket for attachment to and projecting from one corner portion of the frame, a countershaft mounted on the bracket, adjusting means for moving the countershaft along the bracket, another shaft, pulleys on the two shafts, a clutch on the second shaft for coupling the second shaft and second pulley together, a belt for connecting the pulleys, and means for applying power to the first-named countershaft.

8. An engine stand comprising framework with means for supporting an engine thereon, said framework having a side bracket projecting laterally and removable from the framework, a countershaft mounted in the framework and extending lengthwise thereof substantially midway between the sides of the framework, another countershaft mounted on the lateral extension of the framework, means for adjusting the second countershaft toward and from the first countershaft, driving means between the two countershafts, and clutch mechanism for connecting the first-named countershaft to the driving means and disconnecting it therefrom.

In testimony, that we claim the foregoing as our own, we have hereto affixed our signatures.

JOHN W. COLE.
ALVIA E. JOHNSON.